Patented July 8, 1941

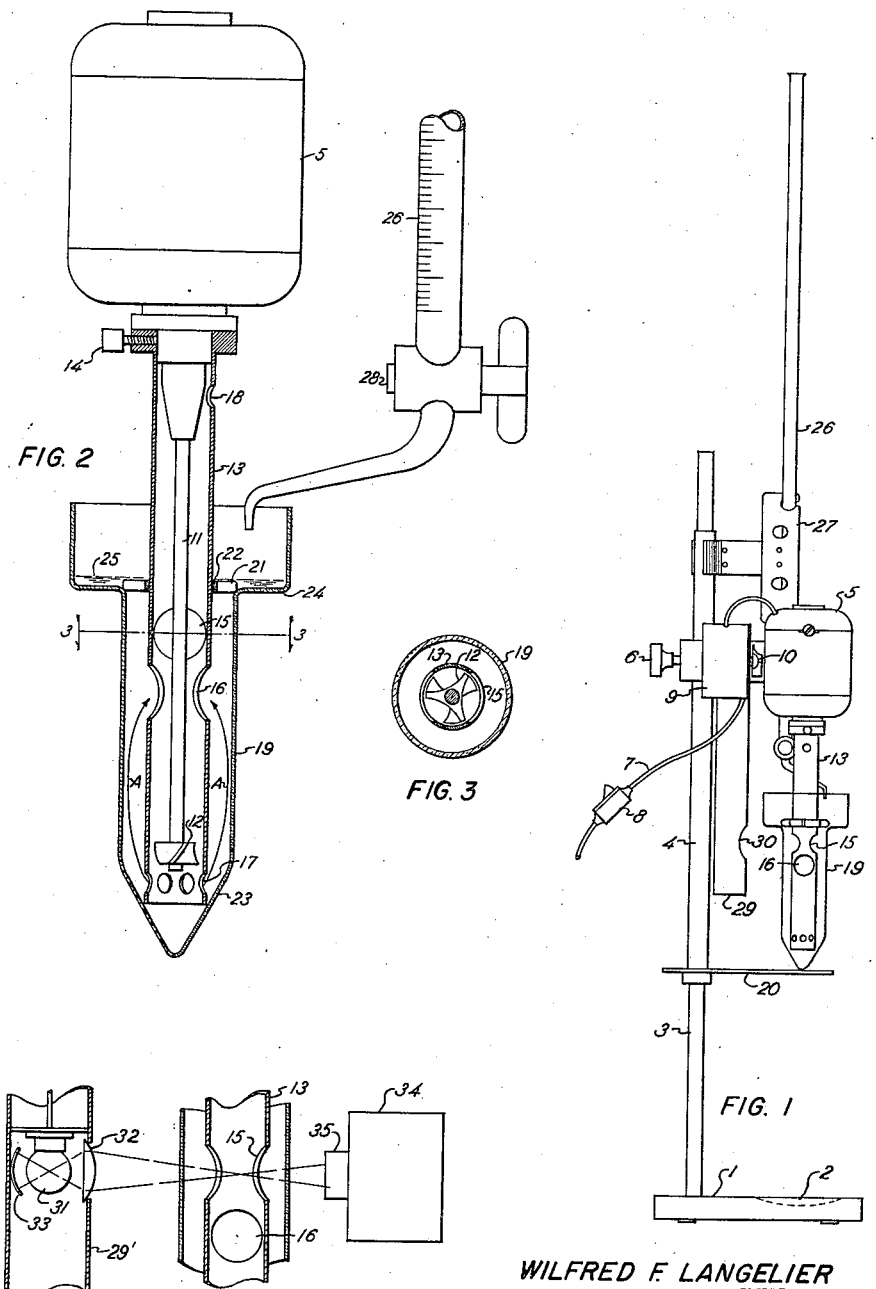

2,248,765

UNITED STATES PATENT OFFICE 2,248,765

METHOD AND APPARATUS FOR ANALYZING WATER AND OTHER SOLUTIONS

Wilfred F. Langelier, Berkeley, Calif.

Application August 28, 1939, Serial No. 292,267

13 Claims. (Cl. 23—230)

This invention relates to testing water with respect to soap, the word water being intended to include besides natural water also artificial aqueous solutions. More particularly, it relates to analyzing water for its content of certain metals by means of soap and to the testing of soap by means of water of known content of certain metals, as well as to other tests involving a reaction between soap and water. By the expression testing water with respect to soap it is intended to include the determination of the equivalent amounts of soap and water (wherein either the water or the soap may be the unknown, or both the strength of the soap and the hardness of the water are known and the influence of a third agent is sought) as well as the determination of whether a given mixture of soap and water contains a quantity of soap which is in excess of or less than the equivalent amount. This application is a continuation-in-part of my copending application Serial No. 229,685, filed September 13, 1938.

The invention may be applied to determine the hardness of water, i. e., to find its content of calcium, magnesium, and other metals which influence the suds-forming characteristics by titration against a standard soap solution, or merely to determine whether the hardness of the water is greater or less than a specified quantity. The water may, for example, be natural or softened water, or a solution containing a known quantity of soil or of a mineral which it is desired to analyze for metals, prepared by dissolving the mineral in an acid, neutralizing, and diluting with distilled water.

It may also be used to evaluate soap by titrating it against a water solution containing a known amount of dissolved metal such as calcium, i. e., having a known hardness. It may be a liquid soap or a solution of comminuted soap dissolved in distilled water or in aqueous ethyl alcohol.

Further, the invention is suitable for evaluating anti-foam compositions marketed for preventing the formation of foam or lather, such as caprylic alcohol, rosin solutions, etc. In this embodiment a measured quantity of the anti-foam agent is placed into the testing receptacle together with distilled water or with water of known hardness, and the resulting mixture is titrated against a standardized soap solution, the quantity of soap required to reach the end point being indicative of the foam-preventing power of the agent.

Other uses of the invention will occur to one reading the present specification.

The use of soap to determine the hardness of water is founded upon the following considerations: When soap is mixed with distilled water and air, a certain small quantity of soap is required to form a permanent layer of suds or lather on the surface when the water is quiet. When, however, the water contains certain metallic ions, particularly calcium and/or magnesium, the metallic ions react with the soap and the formation of suds is prevented until an additional quantity of soap, dependent upon the quantity of such ions in the water, has been added. By subtracting from the total quantity of soap required in any instance to produce suds a value known as the "lather factor," (which corresponds approximately to the aforesaid small quantity) one obtains a quantity of soap, which is proportional to the hardness of the water. This hardness may be expressed in terms of the actual metals present, or as parts of calcium carbonate per million parts of water.

The methods heretofore proposed to determine the equivalent quantities of soap and water involve observing the lather at the surface. Of these the so-called "hand method" is the most accurate; it is a static method, i. e., it involves the observation of the suds while the water is quiescent. As described in "Standard Methods for Examination of Water and Sewage," published by the American Public Health Association, it involves measuring a 50 ml. (milliliter) sample of the water into a 250 ml. glass stoppered bottle, adding standardized soap solution in portions of 0.2 to 0.3 ml., and shaking the bottle by hand vigorously for 15 seconds after each addition. When suds appear, the bottle is laid on its side for five minutes, and the end point is found when the lather on the surface remains unbroken for 5 minutes. In this test the soap solution consists of pure castile soap or sodium or potassium oleate dissolved in 70% ethyl alcohol, and it is standardized by titrating it in the 250 ml. bottle as described above against an aqueous solution of calcium chloride having a concentration equivalent to 80 parts per million of calcium carbonate. The soap solution is diluted so as to have a strength equivalent to about 0.6 to 1.1 mg. (milligrams) of calcium carbonate per ml. of soap.

The necessity for waiting five minutes each time before deciding that the end point has been reached, for employing a proper and uniform intensity of shaking, and for the exercise of a considerable degree of judgment as to the appearance of the suds which are incidents of the hand method, arise from the different speeds with which different metals react with the soap. Thus, when water contains both calcium and magnesium the calcium normally reacts with the soap instantaneously, with the result that suds appear when less than the equivalent amount of soap has been added, and only the calcium, but not all of the magnesium, has reacted. In this case a "ghost" end point is reached and the suds are not permanent but break, usually within five minutes, and sometimes present to the eye of a skillful operator an appearance different from that of the true end point suds. Also, an incorrect intensity of shaking alters the results, since too slow a motion does not disperse enough air in the water to produce suds which are permanent, and, on the other hand, does not insure that all of the metals come in contact with the soap, tending to give too early an end point, thus causing to opposing errors. Also the results are influenced by the ratio of the metals in the water. For example, it was found that when the ratio of magnesium to calcium is small, such as less than 1 to 4, the magnesium will often react very slowly or not at all, resulting in the formation of suds which persist over five minutes although magnesium ions are still present, yielding too low a value for the determined hardness; on the other hand, when the ratio of magnesium is greater than 1 to 3, an excess of soap is often required to cause all of the magnesium to react and to form permanent suds, resulting in too high a value for the determined hardness.

It has also been proposed to employ dynamic methods, wherein the water, air and soap are mixed mechanically and the end point is determined while the water is in motion, by observing the formation of lather on the surface (Patent 2,112,824) or by permitting the suds to overflow from the surface onto an indicating or weighing device (Patent 1,643,243). These proposed methods, however, do not determine the permanence of the suds and for this reason give erroneous results when a ghost end point is encountered. The limitations as to the maximum operating speed, as explained below, make it impossible to operate these devices at speeds which insure a reaction rate of the magnesium and the like which is high enough to insure that suds are formed only when the true end point has been reached.

A further source of inaccuracy in these dynamic methods is that it is difficult or impossible to select a speed of mixing which will give reproducible results, in view of the following conflicting requirements: On the one hand, a fairly strong agitation with air is required to insure contact between the soap and the metals in the water, and to disperse the air sufficiently to produce a froth, it having been found that when mechanical devices are operated at relatively low speeds far greater quantities of soap, often twice the equivalent amount or more, are required to form suds than at higher mixing speeds. On the other hand, a high degree of agitation is inherently undesirable because agitation breaks up the suds on the surface and even prevents suds from forming by retaining the soap beneath the surface of the water, with the result that a larger quantity of soap must be added to form a recognizable layer of suds at the surface than would be required if less agitation or no agitation were used. The error due to these causes is not, however, constant and no simple correction therefor can be made.

Moreover, in such methods the end point is not sharply defined because the movement of the water prevents a building up of the suds, and the suds appear gradually in patches, the first patches of suds being visible long before the end point. It is, therefore, necessary to rely upon judgment as to when the end point is reached. Reliance upon mechanical indicators, such as a photo-cell arranged to cause the suds to interrupt a beam of light or an overflow weir do not increase the precision because the motion of the water prevents the suds from building up to a reproducible height when the end point is reached.

According to the present invention it was found that water can be tested with respect to soap, and that the equivalent amounts of soap can be determined, much more accurately, rapidly, conveniently, and with a greater degree of reproducibility, by agitating the mixture of soap and water in the presence of dispersed air with a speed sufficient to cause the mixture to become substantially opaque to light when at least the equivalent amount of soap is present, and observing the transparency of the agitated or moving mixture, preferably through a fixed observing depth, to determine whether it has a predetermined opacity. As used in this specification and claims, the "equivalent amount of soap" is the total quantity of soap required to reach the end point, i. e., it includes the lather factor, the hardness of the water being determined by subtracting the lather factor from the equivalent amount. It was found that when soap is gradually added to water which is agitated under these conditions there is a sharp increase in the opacity of the mixture when the equivalent amount of soap has been added, giving a readily reproducible end point. In this method little or no lather is formed on the surface of the water when the end point is reached due to the strong agitation employed, practically all of the soap being retained in the body of the water where it aids the formation of an opaque air-in-water dispersion. It was further found that such a strong degree of agitation promotes the reaction of magnesium and similar slow-reacting metals with the soap, and thereby avoids the false end point and obviates the necessity of testing suds for permanence. In the usual mode of operation wherein a quantitative evaluation of soap or water is desired, the soap is added to the water progressively until the predetermined degree of opacity is observed. The method is, however, also applicable to operations wherein soap and water are mixed in a fixed ratio, the resulting mixture is agitated in the presence of dispersed air, and the water is observed to determine merely whether or not the said predetermined degree of opacity occurs.

As used in the present specification and claims the term "lather" is intended to denote a dispersed system of globular liquid films enclosing vapors or gases, such as air. The term "air-in-water dispersion" is intended to denote a dispersed system comprising small bubbles of air dispersed in water, the water being in a mobile form, i. e., a system in which the water forms a continuous phase which is not in the form of a film.

This method differs from the hand method in that the end point is determined under dynamic conditions, avoiding the need for waiting to find out whether the suds are permanent, and making it possible to complete a hardness determination in from one to five minutes, in that a more uniform intensity of agitation is made possible, and in that the opacity of the air-water dispersion instead of the suds on the surface is observed. It differs from the dynamic methods according to the above cited United States patent specifications in that it permits a strong agitation to cause all of the metals to be intimately mixed with the soap and quickly reacted therewith, and in that it makes it possible to select a mixing speed which gives reproducible results. It differs further in that at the equivalence point the formation of a lather at the surface of the air-in-water dispersion is entirely or for the greater part prevented, and in that the equivalence or end point is determined by observing the opacity of the air-in-water dispersion beneath the surface instead of the appearance or thickness of a lather on the surface of the air-in-water dispersion.

Too high a degree of agitation and too fine a dispersion of a great quantity of air in the air-in-water dispersion should, however, be avoided, because it was found that when the speed of the mixing device described herein is too great the air-in-water dispersion becomes opaque before the magnesium has completely reacted. This is believed to be caused by an excessive increase in the air-water interface area which preferentially adsorbs the soap, thereby giving an apparent end point before the soap has reacted with all of the metals.

The method is preferably carried out in the apparatus described herein, but the use of other devices performing equivalent functions of aerating the water, mixing it with soap, and agitating it in an observing zone with a turbulence sufficient to promote the reaction and to retain the suds in the water, may also be employed.

In the drawing, Figure 1 is a side elevation of the preferred form of the apparatus; Figure 2 is an enlarged front elevation, partly in section, of the same apparatus; Figure 3 is a sectional view on section line 3—3 of Figure 2; and Figure 4 is a sectional view of a modified form employing a photo-electric cell.

Referring to Figures 1 to 3, I is a base having a recess 2 to collect liquid accidentally spilled, carrying a vertical rod 3. A slidable sleeve 4 on the rod supports electric motor 5 and is secured by a clamp screw 6. The motor is energized by electric wires 7, having a switch 8, and controlled by a rheostat 9 having a regulating knob 10. A water motor or a hand driven gear drive can be used instead of the electric motor.

The armature shaft of the motor carries a propeller shaft 11 carrying three vanes 12, to impart a downward movement to water. A cylindrical draft tube 13 open at the bottom surrounds the propeller shaft and extends slightly below the propeller vanes. It is secured to the motor by set screw 14. Two diametrically opposed observing holes 15 larger than the diameter of shaft 11 are cut into the tube at a level below the water level. Two inlet holes 16 are cut just below and offset 90° from the holes 15. Six outlet holes 17 are provided at the bottom. An air inlet hole 18 for admitting atmospheric air is provided above the water level.

A glass receptacle 19 is detachably mounted by a supporting arm 20, pivoted about the sleeve 4. The receptacle is centered about the tube 13 by projections 21 extending radially outwardly from a ring 22 frictionally attached to the tube, and by bearing against the bottom of the tube at its conical bottom 23. By swinging the arm 20 away from the receptacle the latter can be slid downwardly. The receptacle has an annular enlargement or shoulder 24 near the top. The size of the receptacle is such that the water sample (100 ml. in the usual test) has its level 25 a few millimeters above the floor of the enlargement 24. Graduations, such as 5, 10, 15, 25, 50, 75 and 100 ml. marks may be engraved on the glass.

A burette 26 or similar measuring and dispensing device is mounted on sleeve 4 by a clamp 27, and located to admit the standard soap solution into the receptacle at a rate regulated by the cock 28. A rate of flow of 1 ml. per minute is preferred, although rates as high as 3 or 4 ml. per minute of soap solution of the strength described heretofore for the hand method may be employed.

An electric lamp is mounted in a metallic container 29 having a window 30 at the level of the observing holes 15; it is wired so as to remain illuminated when the motor is stopped.

To run a test, the water is placed in the receptacle to the level 25 and the motor is started, causing a vortex to form in the draft tube 13, and causing air admitted through hole 18 to be dispersed in the water in small bubbles forming an air-in-water dispersion. The mixture of air and water flows out through holes 17, and then moves upwardly in the annular space between the tube 13 and the receptacle 19 in a generally helical path, due to the rotational or swirling movement imparted by the propeller. The centrifugal force of the water causes almost all of the air bubbles to move toward the draft tube and to enter the tube through the inlet holes 16, together with a considerable amount of water, as indicated by the arrows A. The recirculation of the air through the holes 16 is preferred and can be effected by a proper proportioning of the diameters of the receptacle 19 and the tube 13, one example of correct dimensions being given below. Devices of different diameters wherein the air is not recirculated through holes 16 can also be employed, but in such devices the air flows past the observing holes 15, thereby detracting from the sharpness of the end point.

The soap is then admitted gradually or dropwise from the burette 26, the air-in-water dispersion being observed against the light through the holes 15. (It is also possible to observe the air-in-water dispersion against daylight.) The receptacle 19 at the level of the holes 15 thus forms an observing zone. At first and throughout most of the titration, the air bubbles remain almost constant in size and number. As the equivalence point is approached they rapidly become smaller and more numerous and the air-in-water dispersion assumes a turbid or milky appearance. This milky appearance then becomes more intense until it obscures the light to such an extent that the holes 15 cannot be distinguished from the other portions of the tube 13. The cock 28 is then closed and the quantity of soap is read. The lather factor is subtracted from this quantity to determine the hardness. While it is preferred to add soap until the holes 15 are totally obscured, the end point can also be determined by adding soap until they are almost obscured, i. e., it is possible to select any desired predetermined degree of opacity or transparency of the air-in-water dispersion for the end point, the only requirement being that the soap solution be standardized and the lather factor determined under the same conditions and with the same end point.

When the end point is reached, or even sooner, a few globules or patches of lather will at times appear on the surface of the air-in-water dispersion, but these are not uniform, have no appreciable height, and give no indication of the end point, the bulk of the soap being retained in the air-in-water dispersion. It was found that usually between 0.5 to 1.5 ml. of soap (of a strength equivalent to 1.0 mg. of calcium carbonate per ml. of soap) in excess of that required to obscure the holes 15 must be added to form an unbroken layer of lather on the surface at the ordinary operating speeds, this excess being, however, not uniform and being frequently equal to from 50 to 100% of the equivalent amount of soap. When, after reaching the proper end point by observing the holes, the addition of soap and the rotation of the motor are stopped, a layer of lather of several millimeters in height rapidly builds up at the surface and the dispersion clears, causing the water to lose its opacity. If desired, the water can be left quiescent to observe the permanence of the lather, the enlargement 24 providing a large surface area so as to facilitate this observation. Another means of checking the correctness of the end point consists in observing the approximate time which is required for the clearing up of the air-in-water dispersion after the motor is stopped. A false end point is indicated by a rapid clearing of the air-in-water dispersion, usually 2 or 3 seconds, whereas if the true end point has been reached 15 to 20 seconds will be required. These observations of the lather or the time required for clearing are not, however, essential with this method.

When the speed of the motor is increased more air bubbles are formed and circulated. The speed must not be so great as to draw in so much air and to disperse it so finely that opaque bubbles are formed before the magnesium has reacted with the soap, as was explained heretofore; on the other hand, the minimum speed must be sufficient to induce a complete precipitation of the insoluble soaps when the equivalent amount of soap is present. Operations between these limits of speed (which may, for example, be between 3,000 and 8,000 revolutions per minute for the device shown) are possible. For precise determinations it is, however, desirable that the speed be always the same or about the same, i. e., that it vary not more than about three or four hundred revolutions per minute, because variations in speed affect the appearance of the air-in-water dispersion and result in different end points. A tachometer can be used to indicate the speed.

The speed can be conveniently regulated without a tachometer as follows: When the rheostat 9 is adjusted to increase the speed a secondary vortex of air is formed in the conical bottom 23 beneath the draft tube 13, extending further down as the speed is increased until it reaches the bottom of the receptacle. When no vortex appears in the cone 23 it is not known whether the speed is too low, and when it reaches the bottom of the receptacle it is not known whether the speed is too high. It is preferred to operate at a speed at which the vortex just barely or almost touches the lower tip of the cone 23, but any position, such as half way down, may be selected.

Without limiting the invention to particular dimensions, the following figures are given to describe the device found to give the best results: The height of the water level was 10.7 cm. above the bottom of the cone 23, and 2 mm. above the floor of enlargement 24, which had a diameter of 6.7 cm.; the cone 23 was 2.5 cm. high; the internal diameter of the main portion of the receptacle was 3.5 cm.; the diameter of the draft tube 13 was 1.9 cm. outside, and 1.65 cm. inside; the diameters of the holes 15 and 16 were 1.5 cm; the diameters of the six holes 17 at the bottom were 0.5 cm. With this device a speed of about 6,000 revolutions per minute was found to give excellent results.

In the form according to Figure 4, the end point is determined by means of a photo-electric cell. The metallic container 29' carries a lamp 31, lens 32 and reflecting mirror 33, for directing a beam of light through the water in the receptacle 19 and the observing holes 15 in the draft tube 13, into a photo-electric cell mounted in a container 34 carrying a light shield 35. When the end point is reached the opacity of the water diminishes the intensity of the beam and causes the photo-electric cell to indicate the end point by means of a light or other suitable signal not shown or measuring means electrically connected to the cell.

It should be noted that when the light cell is applied to the device shown in Figures 1 to 3 the shaft 11 does not entirely obscure the light beam because its diameter is less than that of the holes 15; the light beam may, however, also pass along side of the tube 13.

This embodiment is useful not only with the batch method described according to Figures 1 to 3, but also in continuous methods wherein the soap and water are continuously mixed with air and passed once only through an observation zone in a state of turbulence necessary to produce the opacity, as described heretofore. Further, the continuous method can be combined with recirculation of water by continuously feeding the soap and water into a receptacle such as that shown in Figures 1 to 3 and providing overflow means for withdrawing the water. In either the batch method or the continuous method the ratio of soap to water can be varied until the end point is reached, or a constant proportioned mixture of soap and water can be subjected to the test to determine whether or not it contains the equivalent amount of soap. Visual observation is possible, but the photo-electric cell offers certain advantages in industrial installations. Thus, in continuous methods wherein a constant proportioned mixture is tested, the cell can be wired to a signal, or to a recording device on a time chart, or to a relay-controlled valve to control the operation of a water softening plant. When the ratio of soap to water is varied, the cell can also be connected to record the hardness by recording the quantity of soap required to reach the end point; in batch methods this may be effected by recording directly the quantity of soap required or the time required when soap is fed at a constant rate, to reach the end point, while in continuous methods it can record the rate of flow of soap required to reach the end point when water is fed at a constant rate.

In practicing the method it is desirable to add about 1 ml. of a saturated aqueous solution of borax to the 100 ml. water sample to control the pH, which is preferably about 9.2, to improve the accuracy by keeping the amount of soap consumed by hydrolysis at a constant value.

When working with waters having a total hardness in excess of about 75 parts per million of calcium carbonate, it is desirable to dilute the water with an aliquot part of distilled water, and then test 100 ml. of the diluted water.

The procedure may be reversed by gradually adding the water instead of the soap. In this method about 50 to 75 ml. of the water and sufficient soap to render an air-in-water dispersion containing 80 to 100 ml. of the water opaque are placed in the receptacle 19, and the motor is started. The balance of the water is placed in the burette, and added gradually, until it is just possible to distinguish the observing holes 15 from the tube 13. When this predetermined degree of opacity is reached the cock 28 is closed and the total quantity of water is determined.

The methods described heretofore yield the total hardness. The hardness due to each of the several metals can also be determined by precipitating one or more of them and running a test on such metal or metals as remain in solution. Thus, when water contains only calcium and magnesium, a 100 ml. sample may be treated with 2 ml. of saturated aqueous sodium oxalate, left to stand for 20 minutes to 2 hours, and subjected to the test, (either together with the precipitate or after filtering) to find the hardness due to magnesium. Similarly, the magnesium may be removed from the reaction by treating another sample with an acid to convert the carbonate ions to carbonic acid; subsequently removing the latter by aeration, and finally adding sodium hydroxide. The resulting alkaline water can then be tested for calcium hardness. The aeration which causes the vaporization of carbonic acid can be carried out in the apparatus illustrated by operating the motor which disperses air in the acidified water to aerate the same.

I claim as my invention:

1. A method for determining the equivalent amounts of soap and water comprising the steps of commingling measured amounts of soap and water, dispersing air in the resulting soap and water mixture, continuously circulating the resulting air-in-water dispersion through a confined space provided with an optical path beneath the surface of the dispersion while maintaining the dispersion in a state of turbulence sufficient to prevent the formation of a substantial layer of lather on the surface of the dispersion and to retain substantially all of the soap beneath the surface when the quantity of soap in the dispersion is sufficient to form a lather on the surface in the quiescent state, and measuring the relative opacity of the dispersion flowing through said confined space.

2. A method for determining the equivalent amounts of soap and water comprising the steps of commingling measured amounts of soap and water, dispersing air in the resulting soap and water mixture, continuously circulating the resulting air-in-water dispersion through a confined space provided with an optical path beneath the surface of the dispersion while maintaining the dispersion in a state of turbulence sufficient to prevent the formation of a substantial layer of lather on the surface of the dispersion and to retain substantially all of the soap beneath the surface when the quantity of soap in the dispersion is sufficient to form a lather on the surface in the quiescent state, and progressively adding measured increments of soap until the dispersion flowing through said confined space becomes opaque.

3. A method for determining the equivalent amounts of soap and water comprising the steps of commingling measured amounts of soap and water, imparting a rotary motion to the resulting soap and water mixture in a confined zone sufficient to form a vortex and to disperse air in the mixture, continuously flowing the resulting air-in-water dispersion through a confined space provided with an optical path beneath the surface of the dispersion while maintaining the dispersion in a state of turbulence sufficient to prevent the formation of a substantial layer of lather on the surface of the dispersion and to retain substantially all of the soap beneath the surface when the quantity of soap in the dispersion is sufficient to form a lather on the surface in the quiescent state, and measuring the relative opacity of the dispersion flowing through said confined space.

4. An apparatus for testing water with respect to soap, comprising a transparent receptacle adapted to hold water, a draft tube in said receptacle, inlet and outlet means for said draft tube in communication with the water at different points in the draft tube, propeller means within the draft arranged to circulate water through said draft tube and through said inlet and outlet means, and means for dispersing air in the water to produce an air-in-water dispersion which becomes opaque in the presence of soap.

5. An apparatus for testing water with respect to soap, comprising a transparent receptacle adapted to hold water, a draft tube in said receptacle, inlet and outlet means for said draft tube in communication with the water at different points in the draft tube, propeller means within the draft tube arranged to circulate water through said draft tube and through said inlet and outlet means, means for dispersing air in the water to produce an air-in-water dispersion, a source of light disposed to direct a beam of light through the body of dispersion in the receptacle, and a light sensitive cell in the path of said beam, the cell, source of light, and receptacle being so arranged that when the dispersion becomes opaque the light beam is diffused and lessened in intensity before it reaches the cell.

6. An apparatus for testing water with respect to soap, comprising a transparent receptacle adapted to hold soap and water, means for dispersing air in the water and soap mixture, and for mixing the air with the water and soap mixture with a turbulence such as to form an air-in-water dispersion which dispersion is rendered substantially opaque when an equivalent amount of soap is in the water, a source of light disposed to direct a beam of light through the body of the turbulent dispersion in the receptacle, and a light sensitive cell in the path of said beam, the cell, the source of light, and the receptacle being so disposed that when the turbulent dispersion becomes opaque the light beam is diffused and lessened in intensity before it reaches the cell.

7. An apparatus for testing water with respect to soap comprising a transparent receptacle adapted to hold water, a vertical draft tube in said receptacle, inlet means for said draft tube located to admit water and air into the tube at a point spaced substantially from the bottom in communication with the water, means for admitting air into the draft tube, a part of the draft tube being cut away at a level above said inlet means and below the surface of the water to provide an optical path, outlet means for said draft tube located near the bottom of the tube to discharge water and air into the receptacle, and propeller means within the draft tube arranged to impart a downward rotational movement to water within the draft tube with a velocity sufficient to disperse air in the water.

8. The apparatus according to claim 7 wherein the apparatus comprises a source of light disposed to direct a beam of light through said optical path and a light sensitive cell in the path of the beam of light after it emerges from said optical path.

9. An apparatus for testing water with respect to soap, comprising a transparent receptacle adapted to hold water, having a generally cylindrical lower body portion on the lower portion of which is of gradually diminishing cross sectional area, a vertical draft tube open at the bottom extending to said bottom so as to provide a space beneath said draft tube wherein an air vortex can be formed, inlet means for said draft tube located to admit water and air into the tube at a point spaced substantially from the bottom in communication with the water, means for admitting air into the draft tube, outlet means in the side of said draft tube near the bottom of the tube to discharge water and air into the receptacle near the bottom, and propeller means within the draft tube arranged to impart downward and rotational movement to water within the draft tube with a velocity sufficient to disperse air in the water and to form a secondary air vortex in the space beneath the draft tube.

10. An apparatus for determining the equivalent amounts of soap and water, comprising a transparent receptacle adapted to hold water having a generally cylindrical lower body portion and an annular enlargement above said body portion, a vertical draft tube in said receptacle, inlet means for said draft tube located to admit water and air into said tube at a point spaced substantially from the bottom in communication with the water, means for admitting atmospheric air into the draft tube, outlet means for said draft tube located near the bottom of the tube to discharge water and air into the receptacle, propeller means within the draft tube arranged to impart a downward and rotational movement to water within the draft tube with a velocity sufficient to disperse air in the water, and means for introducing measured quantities of liquid into said receptacle.

11. An apparatus for testing water with respect to soap, comprising a transparent receptacle adapted to hold water, a vertical draft tube in said receptacle, inlet means for said draft tube located to admit water and air into said tube at a point spaced substantially from the bottom, in communication with the water, means for admitting atmospheric air into the draft tube, outlet means for said draft tube located near the bottom of the tube to discharge water and air into the receptacle, and propeller means within the draft tube arranged to impart a downward and rotational movement to water within the draft tube with a velocity sufficient to disperse air in the water, the relative sizes of the receptacle and draft tube being such that a major portion of the air discharged through said outlet means is caused to be displaced radially inwardly in the receptacle and to enter the draft tube through said inlet means together with water.

12. An apparatus for testing water with respect to soap, comprising a transparent receptacle adapted to hold water, a vertical draft tube in said receptacle, inlet means for said draft tube located to admit water and air into the draft tube at a level above the bottom and below the surface of the water, means for admitting air into the draft tube, outlet means below said inlet means to discharge water and air into the receptacle, propeller means within the draft tube arranged to impart a downward and rotational movement to water within the draft tube with a velocity to disperse air in the water, and a lamp arranged to direct light through the receptacle.

13. The apparatus according to claim 12 wherein the lamp is located to direct a beam of light through the receptacle at a level above the level of said inlet means and below the surface of the water, and a part of the draft tube is cut away at the level of the lamp so as to permit a beam of light to pass from the lamp through the receptacle and through the draft tube.

WILFRED F. LANGELIER.